US012560743B2

(12) United States Patent
Kawada et al.

(10) Patent No.: US 12,560,743 B2
(45) Date of Patent: Feb. 24, 2026

(54) OPTICAL ELEMENT FOR A LOW FREQUENCY BAND

(71) Applicant: HAMAMATSU PHOTONICS K.K., Hamamatsu (JP)

(72) Inventors: Yoichi Kawada, Hamamatsu (JP); Takashi Yasuda, Hamamatsu (JP); Hiroshi Satozono, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 656 days.

(21) Appl. No.: 17/968,964

(22) Filed: Oct. 19, 2022

(65) Prior Publication Data

US 2023/0130965 A1 Apr. 27, 2023

(30) Foreign Application Priority Data

Oct. 21, 2021 (JP) ................................. 2021-172486

(51) Int. Cl.
G02B 1/08 (2006.01)
G02B 5/30 (2006.01)
H04B 10/11 (2013.01)

(52) U.S. Cl.
CPC ............. G02B 1/08 (2013.01); G02B 5/3083 (2013.01); H04B 10/11 (2013.01)

(58) Field of Classification Search
CPC ... G02B 1/08; G02B 1/10; G02B 1/11; G02B 1/111; G02B 1/113; G02B 1/115; G02B 5/3083; H04B 10/11
See application file for complete search history.

(56) References Cited

U.S. PATENT DOCUMENTS

| | | | |
|---|---|---|---|
| 5,034,750 A | 7/1991 | Cardiasmenos | |
| 2015/0029507 A1* | 1/2015 | Liu | G01B 11/272 |
| | | | 356/327 |
| 2015/0301254 A1 | 10/2015 | Metcalfe et al. | |
| 2016/0277718 A1* | 9/2016 | Teramoto | G02B 1/118 |
| 2017/0276846 A1* | 9/2017 | Ishido | C09B 67/0083 |
| 2021/0053330 A1* | 2/2021 | Kakeya | C08G 18/8054 |

FOREIGN PATENT DOCUMENTS

| | | |
|---|---|---|
| JP | 2006-016239 A | 1/2006 |
| JP | 2006163275 A | 6/2006 |
| JP | 2016142794 A | 8/2016 |
| JP | 2000047014 A | 2/2020 |
| JP | 2020038289 A | 3/2020 |
| JP | 2001147404 A | 5/2021 |

* cited by examiner

*Primary Examiner* — Stephone B Allen
*Assistant Examiner* — Adam W Booher
(74) *Attorney, Agent, or Firm* — Faegre Drinker Biddle & Reath LLP

(57) ABSTRACT

The optical element for a low frequency band includes a substrate including a first main face and a second main face, the substrate having birefringence, and an antireflection film located on the first main face, wherein the low frequency band is lower than a reststrahlen band of the antireflection film, wherein an absolute value of a difference between a first refractive index and a second refractive index of the substrate in the low frequency band is 0.2 or more, and wherein a thickness of the substrate is 15 μm or more and 4000 μm or less.

20 Claims, 9 Drawing Sheets

FREQUENCY (GHz)

FREQUENCY (GHz)

OPTICAL ELEMENT FOR A LOW FREQUENCY BAND

TECHNICAL FIELD

The present disclosure relates to an optical element.

BACKGROUND

One of the optical elements is a wave plate that controls a polarization state of an electromagnetic wave such as a light. In the visible range, for example, a quartz wave plate disclosed in Japanese Patent Application Laid-Open No. 2006-16239 is used.

SUMMARY

A fifth generation mobile communication system (5G) system has been commercialized in accordance with a demand for larger capacity and higher speed of communication. In addition, researches and developments have been conducted to put a sixth generation mobile communication system (6G), which is the next generation, into practical use. Here, for 6G, use of a band including a sub-terahertz band (for example, 0.1 THz to 1.0 THz) has been studied. Thus, researches and developments for optical elements that can be used in this frequency band have also been conducted.

As the optical element, a quartz wave plate as disclosed in Patent Document 1 may be used. Here, as the frequency band is lower, the thickness of the wave plate becomes larger. For example, a quarter wave plate made of quartz in the sub-terahertz band may be thicker than 10 mm. Thus, there is a problem that the optical element becomes huge in a low frequency band including the sub-terahertz band.

It is generally known that materials for an optical element often have a reststrahlen band. It is also known that the materials substantially absorb or reflect light in a band of frequencies corresponding to the reststrahlen band. Thus, in general, an optical element including a material whose reststrahlen band is present is used in a band of frequencies (for example, a visible range, an ultraviolet range, or an infrared range) higher than the reststrahlen band. However, as a result of intensive studies leading to the completion of the present disclosure, it has been found that the absorption rate of the material in a low frequency band lower than the reststrahlen band is larger than that in a high-frequency band higher than the reststrahlen band, but is significantly smaller than that in the reststrahlen band. Based on this finding, when an optical component having a reststrahlen band is used in a low frequency band (for example, a sub-terahertz band) lower than the reststrahlen band, it has been found that the optical component may function as an optical component.

An optical element according to an aspect of the present disclosure is an optical element for a low frequency band lower than a reststrahlen band of an antireflection film, the optical element including a substrate having a first main face and a second main face, the substrate having birefringence, and an antireflection film located on the first main face. An absolute value of a difference between a first refractive index and a second refractive index of the substrate in the low frequency band is 0.2 or more, and a thickness of the substrate is 15 μm or more and 4000 μm or less.

An optical element according to another aspect of the present disclosure includes: a substrate including a first main face and a second main face, the substrate having birefringence; and an antireflection film located on the first main face, wherein an absolute value of a difference between a first refractive index and a second refractive index of the substrate in a low frequency band lower than a reststrahlen band of the antireflection film is 0.2 or more, a thickness of the substrate is 15 μm or more and 4000 μm or less, and, in the low frequency band, a reflectance of the light incident on the optical element is 10% or less.

According to these optical elements, the absolute value of the difference between the first refractive index and the second refractive index of the substrate in a low frequency band (for example, a sub-terahertz band) that is lower than the band of the antireflection film exhibiting the reststrahlen band is 0.2 or more. On the other hand, the absolute value of the refractive index difference of quartz in the sub-terahertz band is about 0.05. Therefore, for example, the thickness of the substrate with respect to electromagnetic waves in the sub-terahertz band can be reduced to about ¼ or less than that of a substrate made of quartz. Therefore, even when the optical element is used in a low frequency band such as a sub-terahertz band, the thickness of the substrate can be set to 4000 μm or less. Here, as the absolute value is higher, the refractive index itself of the substrate is likely to be higher. Therefore, the transmittance of light with respect to the substrate is likely to decrease. On the other hand, by positioning the antireflection film on the substrate, the transmittance of the optical element in the low frequency band can be set to a practically usable level. Therefore, according to the present disclosure, it is possible to provide an optical element that can be practically used even in a low frequency band such as a sub-terahertz band and can be miniaturized.

The absolute value of the difference between the first refractive index and the second refractive index in the low frequency band may be 0.8 or more. In this case, the thickness of the substrate can be favorably reduced.

The absolute value of the difference between the first refractive index and the second refractive index in the low frequency band may be 1.4 or more and 5.0 or less. In this case, the thickness of the substrate can be more favorably reduced.

The substrate may have a trigonal crystal structure containing lithium. The substrate may include at least one of lithium niobate and lithium tantalate. In this case, since the difference between the first refractive index and the second refractive index can be relatively high, the miniaturization of the optical element can be favorably realized.

In the low frequency band, each of an absolute value of a difference between a refractive index of the antireflection film and a square root of the first refractive index and an absolute value of a difference between the refractive index of the antireflection film and a square root of the second refractive index may be 0.5 or less. In this case, the transmittance of the optical element can be further improved.

An absolute value of the difference between the refractive index of the antireflection film in the low frequency band and the refractive index of the antireflection film in the visible range may be 0.5 or more.

The antireflection film may have birefringence in the low frequency band, a first absolute value of a difference between a third refractive index of the antireflection film in the low frequency band and a square root of the first refractive index may be 0.5 or less, and a second absolute value of a difference between a fourth refractive index of the antireflection film in the low frequency band and a square root of the second refractive index may be 0.5 or less. In this case, the transmittance with respect to each of the two refracted lights in the optical element can be improved.

A thickness of the antireflection film may be determined based on a wavelength of light incident on the optical element, the first absolute value, and the second absolute value, and the thickness of the substrate may be determined based on the thickness of the antireflection film, a value obtained by subtracting a phase difference caused by the antireflection film from a phase difference that should be caused by the optical element, and a difference between the first refractive index and the second refractive index. In this case, even when the antireflection film has birefringence, the optical element as a whole can exhibit a desired phase difference.

A fast axis of the substrate may match with a fast axis of the antireflection film, and a slow axis of the substrate may match with a slow axis of the antireflection film. In this case, reflection loss between the substrate and the antireflection film can be easily reduced.

At least one of a fast axis and a slow axis of the substrate may be different from a fast axis and a slow axis of the antireflection film. In this case, the frequency band in which the optical element can be available can be expanded.

The substrate may include titanium oxide and the antireflection film may include aluminum oxide. In this case, miniaturization can be favorably realized.

The antireflection film may include fluoride. The fluoride may include at least one of lithium fluoride, magnesium fluoride, calcium fluoride, and barium fluoride.

The optical element may further include a second antireflection film located on the second main face. In this case, the frequency band in which the optical element can be available can be expanded.

The optical element may further include a light transmitting film located on the antireflection film and having a refractive index lower than that of the antireflection film. In this case, the frequency band in which the optical element can be used can be expanded.

Figure 1A:
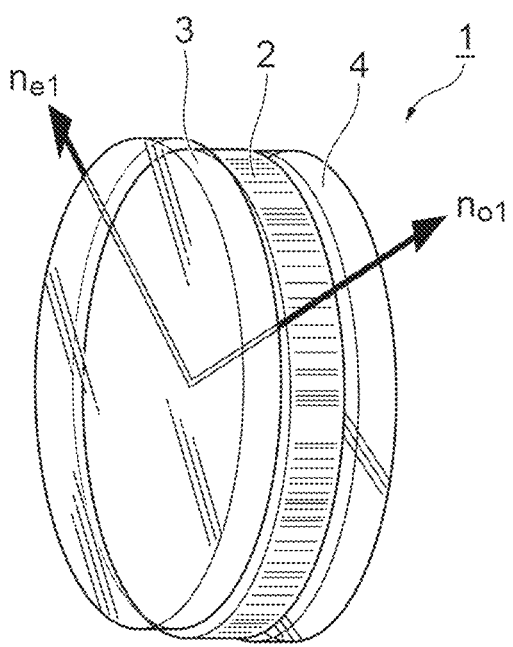
FIG. 1A is a schematic perspective view of an optical element according to an embodiment.

4 a schematic cross-sectional view of a main part of the optical element according to the second modification.

DETAILED DESCRIPTION

Hereinafter, preferred embodiments of one aspect of the present disclosure will be described in detail with reference to the accompanying drawings. In the following description, the same elements or elements having the same functions are denoted by the same reference numerals, and redundant description is omitted. In the following description, "light" includes not only light such as visible light, ultraviolet light, and infrared light, but also electromagnetic waves in a frequency band lower than that of visible light. The frequency band lower than a band of visible light is, for example, 0.1 THz or more and 100 THz or less. In each embodiment described below, a band including a sub-terahertz band (0.1 THz to 1.0 THz) and a part of the terahertz band (1 THz to 10 THz) is referred to as a frequency band of lower than that of visible light (hereinafter also simply referred to as "low frequency band").

Figure 1B:
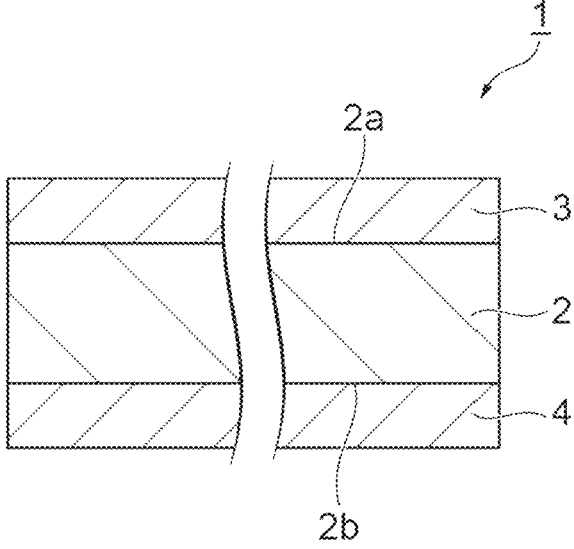
FIG. 1B is a schematic cross-sectional view of a main part of the optical element according to the embodiment.

FIG. 1A is a schematic perspective view of an optical element according to a present embodiment, and FIG. 1B is a schematic cross-sectional view of a main part of an optical element according to a present embodiment. An optical element 1 illustrated in FIGS. 1A and 1B is an element configured for an optical apparatus or an optical system, and is an element used in a low frequency band. The optical element 1 includes a substrate 2 having main faces 2a and 2b, an antireflection film 3 located on the main face 2a, and an antireflection film 4 located on the main face 2b. The substrate 2 and the antireflection films 3 and 4 overlap each other in a thickness direction of the optical element 1. In the thickness direction, the substrate 2 is located between the antireflection films 3 and 4. An orientation flat or a notch may be formed in each of the substrate 2 and the antireflection films 3 and 4. The optical element 1 is included in, for example, a lens, a window material, a polarizer, a wave plate, a spectroscope, an electromagnetic wave light source, a modulator, an absorber, various sensors, and the like. In this embodiment, the substrate 2 of the optical element 1 functions as a wave plate. The wave plate may be a $(2X-1)/2$ wave plate, a $(2X-1)/4$ wave plate, or a $(2X-1)/8$ wave plate, where X is a positive integer, but is not limited thereto.

The substrate 2 is an optical component that exhibits birefringence in the low frequency band, and includes a main face 2a (first main face) facing the antireflection film 3 and a main face 2b (second main face) facing the antireflection film 4. In the present embodiment, the substrate 2 has a substantially disc shape, but is not limited thereto. Each dimension of the substrate 2 is appropriately adjusted according to a use of the optical element 1, a material included in the substrate 2, a frequency of light incident on the optical element 1, and the like. In the present embodiment, the thickness of the substrate 2 is 15 μm or more and 4000 μm or less. When the thickness of the substrate 2 is 15 μm or more, the optical element 1 is less likely to be damaged during transportation or the like. Therefore, handling of the optical element 1 is facilitated. When the thickness of the substrate 2 is 4000 μm or less, for example, even if the optical element 1 is used as a quarter wave plate in a sub-terahertz band, it is possible to suppress an increase in size of the optical element 1. The lower limit of the thickness of the substrate 2 may be, for example, 20 μm, 50 μm, or 100 μm. The upper limit of the thickness of the substrate 2 may be 3000 μm, 2500 μm, 2000 μm, 1500 μm, or 1000 μm.

The two optical axes in the substrate 2 are an ordinary axis and an extraordinary axis. A refractive index with respect to the polarization direction along the ordinary axis is referred to as first refractive index $n_{o1}$, and A refractive index with respect to the polarization direction along the extraordinary axis is referred to as second refractive index $n_{e1}$. The first refractive index $n_{o1}$ is greater than the second refractive index $n_{e1}$. In the substrate 2, the ordinary axis corresponds to a slow axis, and the extraordinary axis corresponds to a fast axis. When light propagates in the substrate 2, a component propagating along the ordinary axis propagates slower than a component propagating along the extraordinary axis. In general, the refractive index has frequency dependence. Therefore, in the present embodiment, each of the first refractive index $n_{o1}$ and the second refractive index $n_{e1}$ is a real part of the refractive index in the frequency band lower than that of visible light. The real part of each refractive index is measured by, for example, a minimum argument method, a critical angle method, or the like. Each of the first refractive index $n_{o1}$ and the second refractive index $n_{e1}$ in the low frequency band may be, for example, 2.0 or more, 2.3 or more, 2.5 or more, 3.0 or more, 5.0 or more, 6.5 or more, or 9.0 or more.

An absolute value of a difference (refractive index difference) between the first refractive index $n_{o1}$ and the second refractive index $n_{e1}$ in the low frequency band is, for example, 0.2 or more and 5.0 or less. When the absolute value of the refractive index difference is 0.2 or more, the thickness of the substrate 2 can be set within the above range even when the optical element 1 is used as a quarter wave plate in the sub-terahertz band. The larger the absolute value is, the thinner the substrate 2 can be. Therefore, the lower limit of the absolute value may be 0.25, 0.3, 0.5, 0.8, or 1.4. Therefore, the absolute value may be 0.25 or more and 5.0 or less, 0.3 or more and 5.0 or less, 0.5 or more and 5.0 or less, 0.8 or more and 5.0 or less, or 1.4 or more and 5.0 or less. Further, the upper limit of the absolute value may be 4.5, 4.0.3.5, or 3.0. A material having a larger absolute value is likely to be more suitable for a wavelength plate or the like, and a material having a smaller absolute value is likely to be more suitable for a window material, a lens, or the like.

The substrate 2 includes a material exhibiting birefringence in the low frequency band. The material, for example, is an oxide, a boride, a nitride, a chloride, a bromide, and a fluoride. The material may be a crystal exhibiting birefringence (birefringent crystal). In this case, the substrate 2 may be formed of a birefringent crystal or may include a birefringent crystal as a main component. The birefringent crystal contains two or more kinds of elements, and is not particularly limited. Examples thereof include an oxide crystal, a nitride crystal, a chloride crystal, a bromide crystal, and a fluoride crystal. The crystal structure of the birefringent crystal is not particularly limited, and examples thereof include a trigonal crystal structure, a tetragonal crystal structure, an orthorhombic crystal structure, and a hexagonal crystal structure. The material of the substrate 2 is appropriately selected in accordance with the wavelength transmitting in the optical element 1, a size of the optical element 1, and the like.

When the crystal structure of the birefringent crystal is a trigonal crystal structure, the birefringent crystal may include, for example, lithium, boron, or the like. When the birefringent crystal includes lithium, the crystal structure of the birefringent crystal may be a similar structure of a trigonal ilmenite. The substrate 2 may include, for example, at least one of lithium niobate and lithium tantalate. From the viewpoint of miniaturization of the substrate 2, the substrate 2 may include lithium niobate. When the birefringent crystal has a trigonal crystal structure including boron, the substrate 2 may include, for example, a BBO crystal ($\beta$-barium borate crystal, $\beta$-BaB$_2$O$_4$).

When the crystal structure of the birefringent crystal is a tetragonal crystal structure or an orthorhombic crystal structure, the birefringent crystal may include, for example, titanium. In this case, the substrate 2 may include, for example, titanium oxide. When the crystal structure of the birefringent crystal is a hexagonal crystal structure, the birefringent crystal may include, for example, aluminum (Al) or the like. In this case, the substrate 2 may include, for example, aluminum oxide (in particular, sapphire which is a type of $\alpha$-alumina). When the substrate 2 includes titanium or aluminum, the substrate 2 can be produced at a lower cost than when the substrate 2 contains lithium.

The antireflection film 3 is an optical component for reducing face reflection at the main face 2a of the substrate 2, and has a single-layer structure. The antireflection film 4 (second antireflection film) is an optical component for reducing face reflection at the main face 2b of the substrate 2, and has a single-layer structure. In the present embodiment, the antireflection films 3 and 4 have the same structure and composition. Therefore, only the antireflection film 3 will be described in detail below.

The thickness of the antireflection film 3 is appropriately adjusted according to the use of the optical element 1, the material included in the substrate 2, the material included in the antireflection film 3, the frequency of light incident on the optical element 1, and the like. For example, the ideal thickness of the antireflection film 3 is determined by setting the wavelength of the light incident on the optical element 1 to ¼ and dividing the wavelength by the refractive index of the antireflection film 3. In the present embodiment, the antireflection film 3 has a thickness of 2 μm or more and 550 μm or less. For example, when, in a low frequency band, light is incident on the optical element 1, the reflectance of the light incident on the optical element 1 is preferably as low as possible and is, for example, 10% or less. In this case, the light transmittance of the optical element 1 may be 90% or more. The reflectance may be 8% or less, 5% or less, 3% or less, 1% or less, or 0.5% or less. The antireflection film 3 may be directly fixed to the main face 2a, or may be indirectly fixed to the main face 2a. In the former case, the antireflection film 3 is a coating part for the main face 2a, for example. In the latter case, the antireflection film 3 is fixed on the main face 2a via an adhesive or the like, for example.

The antireflection film 3 includes a material exhibiting a reststrahlen effect. The reststrahlen effect is a phenomenon in which light becomes difficult for light in a specific energy band to propagate through a medium. The frequency band corresponding to the specific energy band is close to the vibration frequency of ions contained in the medium. The specific energy band is also referred to as a reststrahlen band. The wavelength of light in a particular energy band is, in many cases, about 100 times the wavelength of visible light. In other words, in many cases, a wavelength region corresponding to the reststrahlen band is within a range of 10 μm to 100 μm, and a frequency band corresponding to the reststrahlen band is within a range of about 5 THz to 100 THz. Therefore, it can be said that at least a part of a low-frequency band lower than visible light in the present embodiment corresponds to a low-frequency band lower than the reststrahlen band of the antireflection film 3.

As described above, in the low frequency band, each of the first refractive index $n_{o1}$ and the second refractive index $n_{e1}$ of the substrate 2 is relatively high. Therefore, the refractive index of the antireflection film 3 in the low frequency band may also be relatively high. For example, the absolute value of difference between the refractive index of the antireflection film 3 in a frequency band lower than the reststrahlen band (e.g., a low frequency band) and the refractive index of the antireflection film 3 in a frequency band higher than the reststrahlen band (e.g., visible range) may be 0.5 or more. In this case, the antireflection function of the antireflection film 3 with respect to the substrate 2 can be likely to be favorably exhibited. In particular, there is a tendency that the function of the antireflection film 3 can be favorably exhibited with respect to the substrate 2 in which each of the first refractive index $n_{o1}$ and the second refractive index $n_{e1}$ is 5.0 or more.

In the low frequency band, the refractive index of the antireflection film 3 is equal to or more than the refractive index of air (1 or more) and equal to or less than the refractive index of the substrate 2 (second refractive index $n_{e1}$ or less). From the viewpoint of light transmittance from the substrate 2 to the antireflection film 3, the refractive index of the antireflection film 3 in the low frequency band is close to both a square root of the first refractive index $n_{o1}$ and a square root of the second refractive index $n_{e1}$ of the substrate 2. For example, each of the absolute values of a difference between the refractive index of the antireflection film 3 in the low frequency band and the square root of the first refractive index $n_{o1}$ of the substrate 2, and of a difference between the refractive index of the antireflection film 3 in the low frequency band and the square root of the second refractive index $n_{e1}$ is 0.5 or less. In this case, the reflectance of light incident on the antireflection film 3 from the substrate 2 can be suppressed to 5% or less. The absolute value may be 0.3 or less or may be 0.1 or less in the low frequency band. When the absolute value is 0.1 or less, in the low frequency band, the reflectance of the light incident on the antireflection film 3 from the substrate 2 can be suppressed to less than 1%.

The antireflection film 3 includes, for example, an oxide, a boride, a nitride, a chloride, a bromide, and a fluoride. They may be crystalline. In this case, the antireflection film 3 may be formed of a crystal or may include a crystal as a main component. Examples of oxides having the above-described performance (that is, exhibiting the reststrahlen effect and having the above-described refractive index) include zinc oxides (ZnO). Examples of the chloride having the above-described performance include cesium chloride (CsCl). Examples of the bromide having the above-described performance include cesium bromide (CsBr). Examples of the fluoride having the above-described performance include lithium fluoride (LiF), calcium fluoride ($CaF_2$), and barium fluoride ($BaF_2$). When the antireflection film 3 contains fluoride, the antireflection film 3 may contain at least one of lithium fluoride, calcium fluoride, and barium fluoride.

Next, an example of a method of manufacturing the optical element 1 will be described with reference to FIGS. 2A to 3C. FIGS. 2A to 3C are each a pattern diagram for describing the method for manufacturing an optical element according to the present embodiment. Hereinafter, an example of a method of manufacturing a quarter wave plate suitable for light of 0.3 THz as the optical element 1 will be described.

Figure 2A:
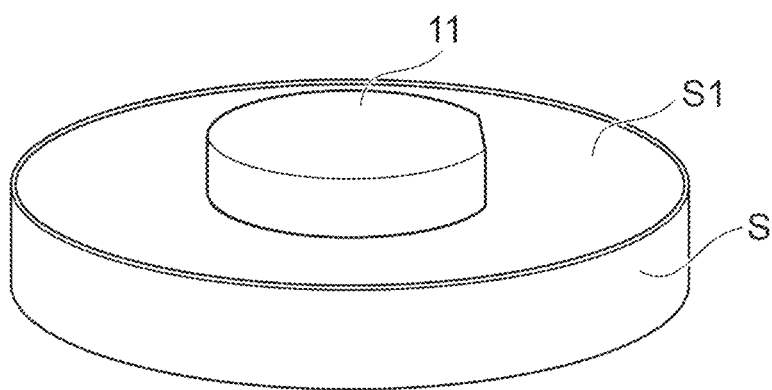
FIGS. 2A to 2C are diagrams schematically illustrating a method for manufacturing an optical element according to an embodiment.

First, as shown in FIG. 2A, a first base member 11 is placed on a base S (first step). In the first step, the first base member 11 is fixed on a flat face S1 of the base S using various types of adhesive. The first base member 11 is a member that becomes the antireflection film 3 later, and is thicker than the antireflection film 3. In the first step, for example, a calcium fluoride crystal wafer of 1.5 inches is used as the first base member 11.

Figure 2B:
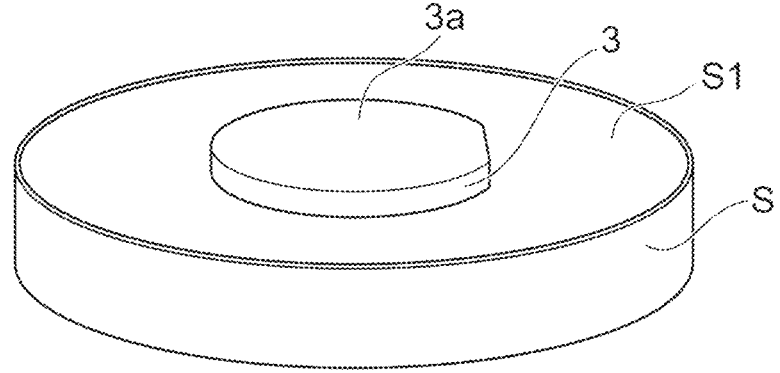

Next, as shown in FIG. 2B, the antireflection film 3 is formed by thinning the first base member 11 (second step). In the second step, the first base member 11 is thinned until the thickness of the first base member 11 becomes a desired thickness. At this time, the first base member 11 is made thin so that the top face of the first base member 11 becomes parallel to the flat face S1. For example, the first base member 11 is thinned by chemical mechanical polishing (CMP), fly-cutting, or the like. After the second step, an antireflection film 3 that is, for example, 90 μm or more and 120 μm or less (target: 107 μm) thick and has an exposed face 3a is formed.

Figure 2C:
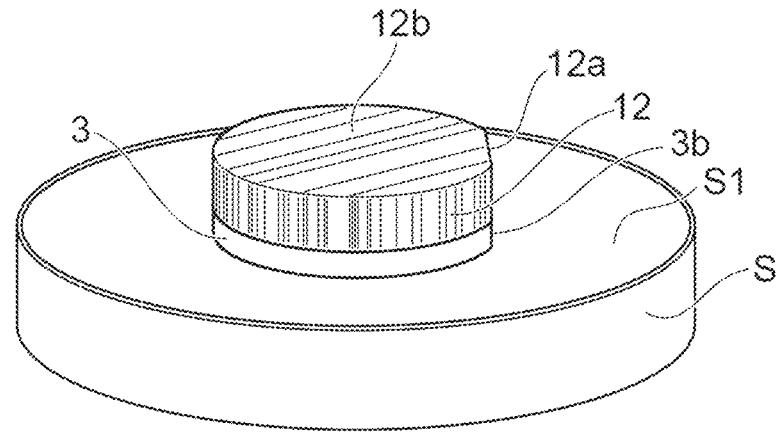

Next, as shown in FIG. 2C, the second base member 12 is placed on the antireflection film 3 (third step). In the third step, the second base member 12 is placed on the antireflection film 3 such that an orientation flat 3b provided at an edge portion of the antireflection film 3 and an orientation flat 12a provided at an edge portion of the second base member 12 are aligned with each other. At this time, the second base member 12 is fixed on the exposed face 3a of the antireflection film 3 using various types of adhesive. The second base member 12 is a member that becomes the substrate 2 later and is thicker than the substrate 2. In the third step, a lithium niobate crystal is used as the second base member 12, but no limited thereto. The adhesive (second adhesive) located between the antireflection film 3 and the second base member 12 is different from the adhesive (first adhesive) located between the base S and the first base member 11. The second adhesive may be hardly soluble in the solvent of the first adhesive.

Figure 3A:
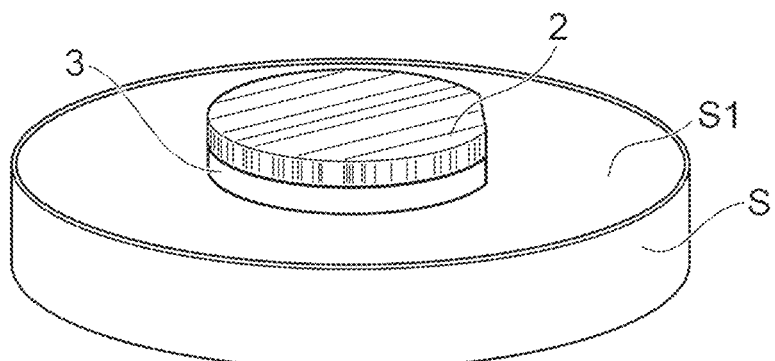
FIGS. 3A to 3C are diagrams schematically illustrating a method for manufacturing an optical element according to an embodiment.

Next, as shown in FIG. 3A, the substrate 2 is formed by thinning the second base member 12 (fourth step). In the fourth step, the second base member 12 is thinned until a thickness of the second base member 12 reaches a desired thickness. At this time, the second base member 12 is thinned so that the exposed face 12b of the second base member 12 becomes parallel to the flat face S1. After the fourth step, a substrate 2 having a thickness of, for example, 130 μm or more and 180 μm or less (target: 161 μm) and functioning as a quarter wave plate is formed.

Figure 3B:
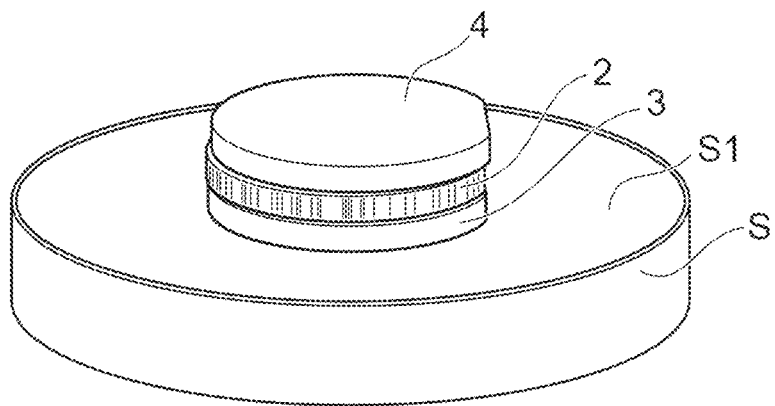
Figure 3C:
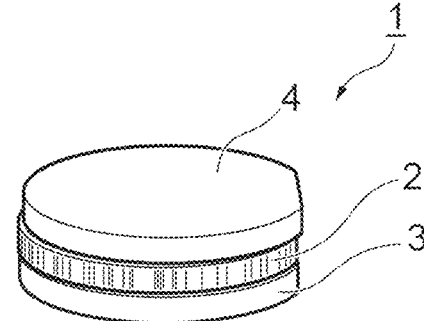

Next, as shown in FIG. 3B, an antireflection film 4 is formed on the substrate 2 (fifth step). In the fifth step, first, a third substrate (not shown) to be the antireflection film 4 later is placed on the main face 2b of the substrate 2. At this time, the substrate 2 and the third base material are fixed by the second adhesive. Subsequently, the antireflection film 4 is formed by thinning the third substrate to a desired thickness. After the fifth step, the antireflection film 4 having a thickness of, for example, 90 μm or more and 120 μm or less (target: 107 μm) is formed.

Next, the optical element 1 including the substrate 2 and the antireflection films 3 and 4 is removed from the base S (sixth step). In the sixth step, the first adhesive is removed using a solvent. The solvent may be any solvent as long as the first adhesive is easily soluble and the second adhesive is hardly soluble. The optical element 1 removed from the base S may be appropriately processed.

The operation and effect of the optical element 1 according to the present embodiment will be described using the optical element 1 manufactured by the above-described manufacturing method. That is, the operation and effect of the optical element 1 will be described using, as a concrete example, the optical element 1 including the substrate 2 which is a quarter wave plate formed of a lithium niobate crystal and suitable for light of 0.3 THz, and antireflection films 3 and 4 formed of a calcium fluoride crystal.

Figure 4:
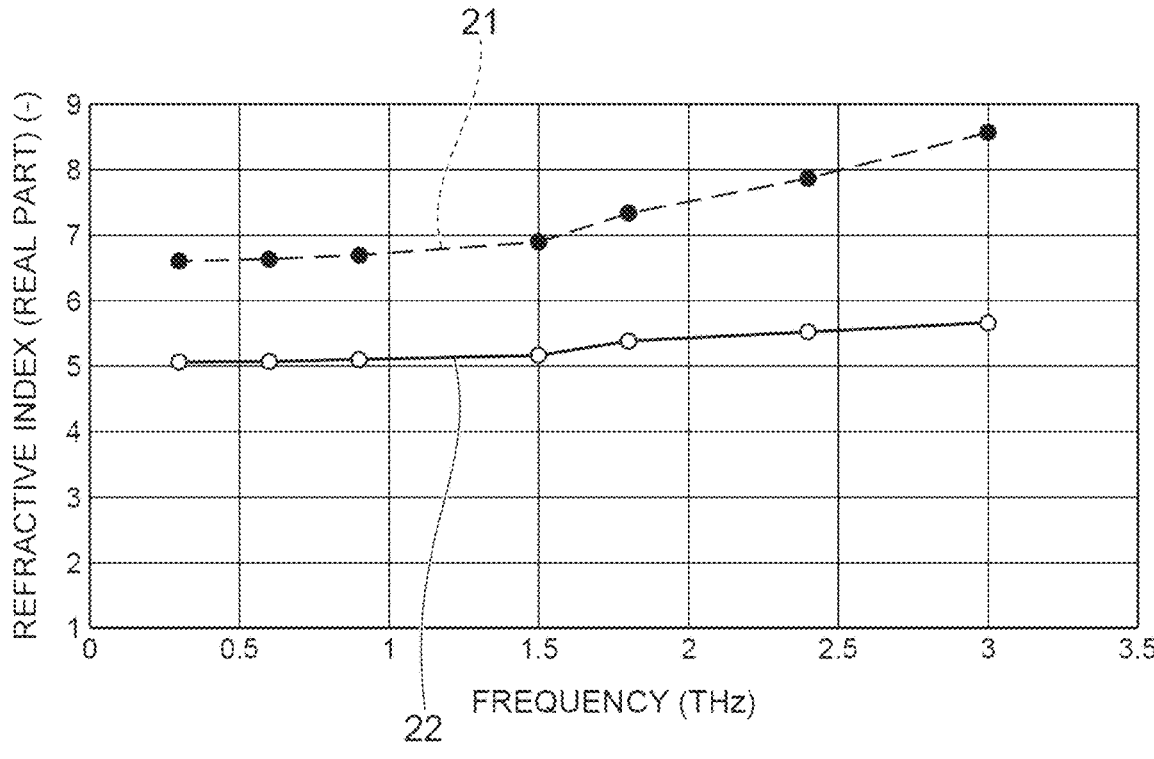
FIG. 4 is a graph showing a refractive index of a lithium niobate crystal in a low frequency band.

FIG. 4 is a diagram showing a refractive index of a lithium niobate crystal in a low frequency band. In FIG. 4, a vertical axis represents a real part of the refractive index, and a horizontal axis represents a frequency. Plot 21 shows the real part of the first refractive index of the lithium niobate crystal, and plot 22 shows the real part of the second refractive index of the lithium niobate crystal. When the frequency is 0.3 THz, the real part of the first refractive index is 6.61 and the real part of the second refractive index is 5.06. Therefore, when the frequency is 0.3 THz, an absolute value of the difference (refractive index difference) between the first refractive index and the second refractive index is about 1.5. Thus, when the substrate 2 is formed of lithium niobate crystal, a thickness of the substrate 2 in the quarter wave plate suitable for 0.3 THz light can be set to 130 μm or more and 180 μm or less. When the substrate 2 is formed of lithium niobate crystal, a thickness of the substrate 2 in the quarter wave plate suitable for 0.9 THz light can be set to be about 50 μm.

On the other hand, the absolute value of the refractive index difference of quartz in the sub-terahertz band is about 0.05. Therefore, when quartz is used as the substrate in the quarter wave plate suitable for light of 0.3 THz, a thickness of the substrate is about 5.3 mm (about 5300 μm). The thickness of this substrate is about 30 times the thickness of the substrate 2 formed of a lithium niobate crystal. Further, according to the simulation, when the absolute refractive index difference of the substrate included in the quarter wave plate suitable for light of 0.1 THz is 0.2, a thickness of the substrate is estimated to be about 3.75 mm (3750 μm). As described above, since the absolute value of the refractive index difference is 0.2 or more such as the substrate 2 included in the optical element 1 according to the present embodiment, the thickness of the substrate 2 can be set to 4000 μm or less even when the optical element 1 is used in a low frequency band such as a sub-terahertz band.

Figure 5:
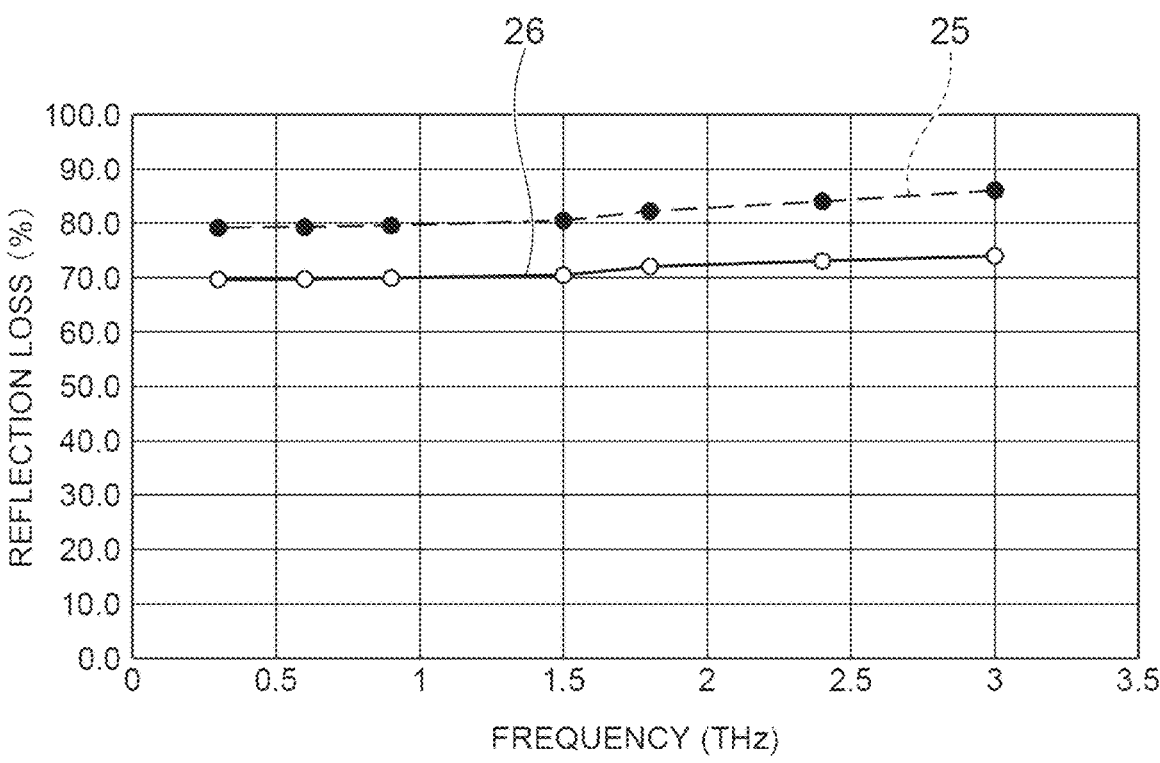
FIG. 5 is a diagram showing a reflection loss of a lithium niobate crystal in a low frequency band.

FIG. 5 is a diagram showing reflection loss of a lithium niobate crystal in a low frequency band. In FIG. 5, a vertical axis represents a reflection loss of the lithium niobate crystal, and a horizontal axis represents a frequency. Plot 25 shows the reflection loss of a polarization component along the ordinary axis of the lithium niobate crystal, and plot 26 shows the reflection loss of a polarization component along the extraordinary axis of the lithium niobate crystal. As shown in FIG. 5, in the low frequency band, the lithium niobate crystal exhibits a reflection loss of 70% or more for any polarization component. Generally, in a material exhibiting birefringence, the reflection loss of the material is likely to be higher as the absolute value of the refractive index difference is larger. Therefore, from the viewpoint of the reflection loss, the substrate 2 including the lithium niobate crystal is not necessarily useful in the low frequency band.

Figure 6A:
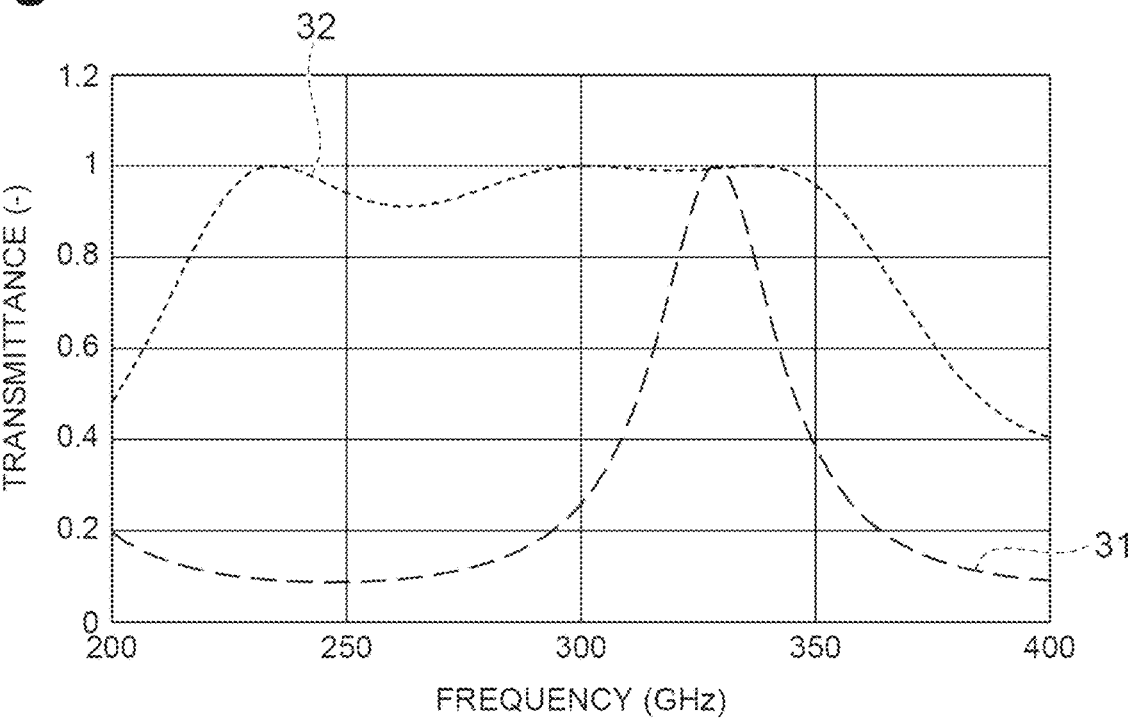
FIGS. 6A and 6B are diagrams respective showing simulation results of transmittances of optical elements.
Figure 6B:
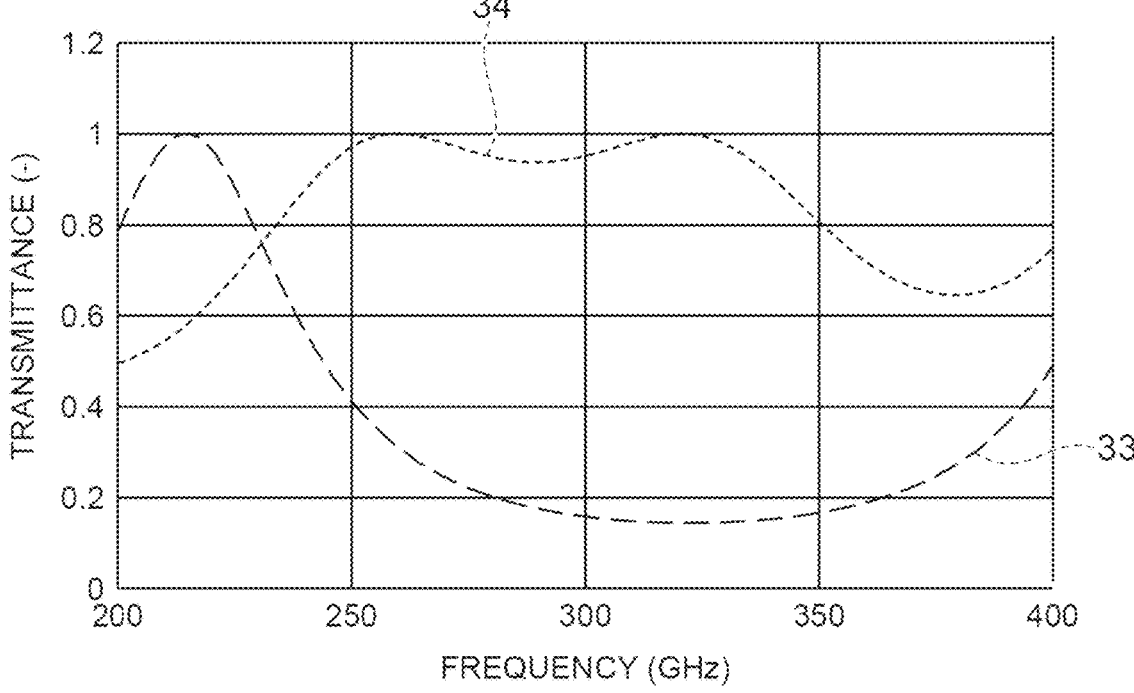

Therefore, in the present embodiment, the antireflection film 3 is provided as one of the solutions for reducing the reflection loss of the substrate 2. FIGS. 6A and 6B are diagrams showing simulation results of transmittances of optical elements. FIG. 6A shows simulation results of transmittances of polarization components along the ordinary axis, and FIG. 6B shows simulation results of transmittances of polarization components along the extraordinary axis. In each of FIGS. 6A and 6B, the vertical axis represents transmissivity (%), and the horizontal axis represents frequency (GHz). In FIG. 6A, plot 31 shows the transmission when the optical element is only a lithium niobate crystal (i.e., when the optical element is only a substrate). Plot 32 shows the transmittance when the substrate of the optical element is a lithium niobate crystal and each antireflection film is a calcium fluoride crystal. In FIG. 6B, plot 33 shows the transmission when the optical element is only a lithium niobate crystal (i.e., when the optical element has only a substrate). Plot 34 shows the transmittance when the substrate of the optical element is a lithium niobate crystal and each antireflection film is a calcium fluoride crystal.

As shown in FIGS. 6A and 6B, when the optical element includes only the substrate, the transmissivity is high only in a very partial band due to the etalon effect. However, the transmissivity at 0.3 THz (300 GHz) is lower than 0.4 in any polarized light components. Therefore, it cannot be said that an optical element having only a substrate can be practically used as a quarter wave plate suitable for 0.3 THz. In contrast, if the optical element has an antireflection film, the transmission at 0.3 THz is greater than 0.9 for both polarization components. In addition, the frequency band exhibiting a transmission of more than 0.9 is clearly broadened compared to the case where the optical element has only a substrate. As described above, when the antireflection film 3 including a material exhibiting the reststrahlen band is used in a low frequency band (for example, sub-terahertz band) lower than the reststrahlen band, the function of the antireflection film 3 with respect to the substrate 2 can be exhibited to a sufficiently practical performance (for example, the reflectivity of light incident on the optical element 1 is 10% or less). Therefore, according to the present embodiment, as described above, it is possible to provide the optical element 1 that can be used in a low frequency band such as a sub-terahertz band and can be miniaturized.

In the present embodiment, the absolute value of the difference between the first refractive index $n_{o1}$ and the second refractive index $n_{e1}$ may be 0.8 or more or may be 1.4 or more and 5.0 or less. As the absolute value is larger, the thickness of the substrate 2 can be thinner. The absolute value of the lithium niobate crystal at 0.3 THz is about 1.55. The absolute value of the lithium tantalate crystal at 0.3 THz is 0.366, the absolute value of the BBO crystal at 0.25 THz is about 0.24, the absolute value of the sapphire at 0.3 THz is about 0.33, and the absolute value of the titanium dioxide crystal at 0.3 THz are about 3.7. The real part of the first refractive index of the BBO crystal at 0.25 THz is 2.81, and the real part of the second refractive index is 2.57. The real part of the first refractive index of sapphire at 0.3 THz is 3.412, and the real part of the second refractive index is 3.083. The real part of the first refractive index of the titanium dioxide crystal at 0.3 THz is 12.85, and the real part of the second refractive index is 9.15.

In this embodiment, the substrate 2 may have a trigonal crystal structure containing lithium. Further, the substrate 2 may include at least one of lithium niobate and lithium tantalate.

In the present embodiment, the absolute value of the difference between the refractive index of the antireflection film 3 and the square root of the first refractive index $n_{o1}$ of the substrate 2 and the difference between the refractive index of the antireflection film 3 and the square root of the second refractive index $n_{e1}$ of the substrate 2 in the low frequency band is each 0.5 or less. Therefore, the transmittance of the optical element 1 can be further improved.

Specifically, it is generally known that as the refractive index of the antireflection film 3 is closer to the square root of the refractive index of the substrate 2, light is more likely to be transmitted from the substrate 2 to the antireflection film 3. When the frequencies are 0.3 THz, the square root of the first refractive index (real part) of the substrate 2 of the lithium niobate crystal is 2.335, and the square root of the second refractive index (real part) of the substrate 2 is 2.173. When the wave length is 5 μm (frequency is about 60 THz), the refractive index of the calcium fluoride crystal is generally known as about 1.4. It is also generally known that the transmission wavelength range of calcium fluoride crystal is generally 0.13 μm or more and 1 μm or less. On the other hand, the refractive index of a calcium fluoride crystal in a frequency band lower than the reststrahlen band is generally unknown. The frequency band corresponding to the reststrahlen band of calcium fluoride crystals is from 7 THz to 15 THz. As a result of investigation, it was found that the refractive index of the calcium fluoride crystal was 2.54 at frequency of 0.3 THz. Each of the absolute value of the difference between the refractive index and the square root of the first refractive index (real part) of the substrate 2 and the absolute value of the difference between the refractive index and the square root of the second refractive index (real part) of the substrate 2 is 0.5 or less. These absolute values are substantially satisfied at least in a low frequency band lower than the reststrahlen band of the calcium fluoride crystal. Therefore, in the optical element 1 including the substrate 2 formed of a lithium niobate crystal and the antireflection film 3 formed of a calcium fluoride crystal, in which the thickness of the substrate 2 and the thickness of the antireflection film 3 are appropriately adjusted, for example, in a low frequency band, the reflectance of light incident on the antireflection film 3 from the substrate 2 can be favorably reduced.

In the present embodiment, the absolute value of the difference between the refractive index of the antireflection film 3 in the low frequency band and the refractive index of the antireflection film in the visible range may be 0.5 or more. In this case, the antireflection function of the antireflection film 3 with respect to the substrate 2 can be likely to be favorably exhibited. In particular, the function of the antireflection film 3 can be likely to be favorably exhibited with respect to the substrate 2 in which each of the first refractive index $n_{o1}$ and the second refractive index $n_{e1}$ is 5.0 or more.

In this embodiment, the optical element 1 includes an antireflection film 4 located on the main face 2b in addition to the antireflection film 3. Thus, the frequency band in which the optical element 1 can be used can be expanded.

Next, modifications of the above embodiment will be described. In the description of each modification, the description overlapping with the above-described embodiment will be omitted, and portions different from the above-described embodiment will be described. That is, the description of the above-described embodiment may be appropriately used in each modification within a technically possible range.

First Modification

The optical element according to the first modification is different from the above-described embodiment in that an antireflection film that exhibits birefringence at least in a low frequency band is used. In the first modification, the refractive index with respect to the polarization direction along the ordinary axis of the antireflection film 3 is referred to as a third refractive index $n_{o2}$, and the refractive index with respect to the polarization direction along the extraordinary axis is referred to as a fourth refractive index $n_{e2}$. The third refractive index $n_{o2}$ is greater than the fourth refractive index $n_{e2}$. In the antireflection film 3 indicating birefringence, the ordinary axis corresponds to the slow axis, and the extraordinary axis corresponds to the fast axis.

In the first modification, the substrate 2 and the antireflection films 3 and 4 are arranged such that the ordinary axis of the substrate 2 and the ordinary axes of the antireflection films 3 and 4 match with each other and the extraordinary axis of the substrate 2 and the extraordinary axes of the antireflection films 3 and 4 match with each other. In addition, each of an absolute value (first absolute value) of a difference between the third refractive index $n_{o2}$ of the antireflection film 3 and a square root of the first refractive index $n_{o1}$ of the substrate 2 in the low frequency band, and an absolute value (second absolute value) of a difference between the fourth refractive index $n_{e2}$ of the antireflection film 3 and the square root of the second refractive index $n_{e1}$ in the low frequency band is, for example, 0.5 or less. In this case, in the low frequency band, the reflectance of each polarization component incident on the optical element 1 can be suppressed to 7% or less. The absolute values may be 0.3 or less or may be 0.1 or less. When the absolute values are 0.1 or less, in the low frequency band, the reflectance of each polarization component incident on the optical element 1 can be suppressed to less than 1%.

The material included in the antireflection film 3 includes an oxide, a boride, a nitride, a chloride, a bromide, a fluoride, and the like as in the above-described embodiment. The material may be crystalline. Examples of the oxide include sapphire, which is a type of aluminum oxide. Examples of the fluoride include magnesium fluoride. As described above, the real part of refractive indices of sapphire at 0.3 THz are 3.412, 3.083, respectively. The real part of refractive indices of magnesium fluoride magnesium fluoride at 0.3 THz are 2.335, 2.173, respectively.

Figure 7:
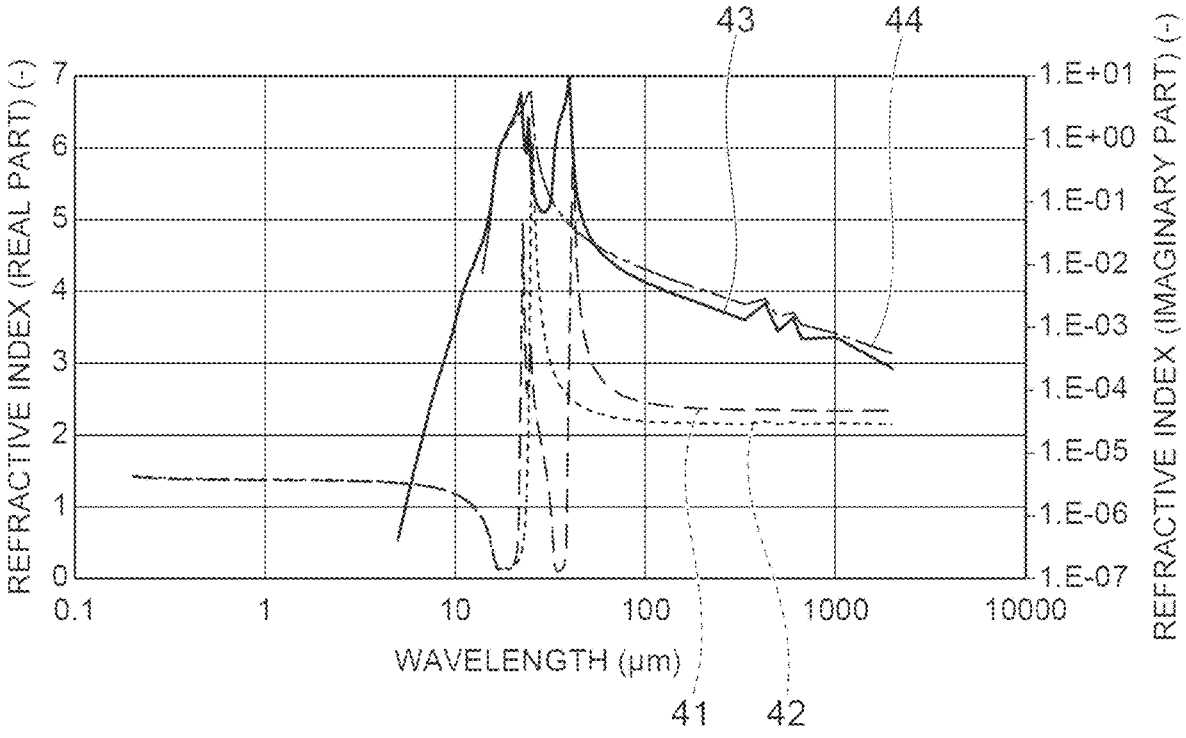
FIG. 7 is a graph showing a refractive index of magnesium fluoride with respect to a wavelength of incident light.

FIG. 7 is a graph showing a refractive index of magnesium fluoride with respect to the wavelength of incident light. In FIG. 7, a vertical axis represents a real part of the refractive index or an imaginary part of the refractive index, and a horizontal axis represents a wavelength of incident light. In FIG. 7, plots 41 and 42 respectively show the real part of the refractive index of magnesium fluoride, and plots 43 and 44 respectively show the imaginary part of the refractive index of magnesium fluoride. As shown in FIG. 7, in the range of wavelengths from 10 μm to 100 μm, the refractive index (particularly the imaginary part) is high. This range corresponds to the reststrahlen band of magnesium fluoride. In addition, the refractive index at wavelengths longer than the reststrahlen band, i.e., at low frequency, is generally greater than the refractive index at wavelengths shorter than the reststrahlen band, i.e., at high frequency, by 0.5 or more. However, for example, when the wavelength is 100 μm or more, the imaginary part of the refractive index of magnesium fluoride is 0.01 or less.

For example, in the case where sapphire, which is aluminum oxide, is used as the material of the antireflection film 3 and titanium dioxide is used as the material of the substrate 2, at 0.3 THz and its vicinity, each of the absolute value of the difference between the third refractive index $n_{o2}$ of the antireflection film 3 and the square root of the first refractive index $n_{o1}$ of the substrate 2 and the absolute value of the difference between the fourth refractive index $n_{e2}$ of the antireflection film 3 and the square root of the second refractive index $n_{e1}$ in the low frequency band is 0.2 or less. In addition, when magnesium fluoride is used as the material of the antireflection film 3 and lithium niobate is used as the material of the substrate 2, at 0.3 THz and its vicinity, each of the absolute value of the difference between the third refractive index $n_{o2}$ of the antireflection film 3 and the square root of the first refractive index $n_{o1}$ of the substrate 2 and the absolute value of the difference between the fourth refractive index $n_{e2}$ of the antireflection film 3 and the square root of the second refractive index $n_{e1}$ in the low frequency band is 0.25 or less.

Figure 8A:
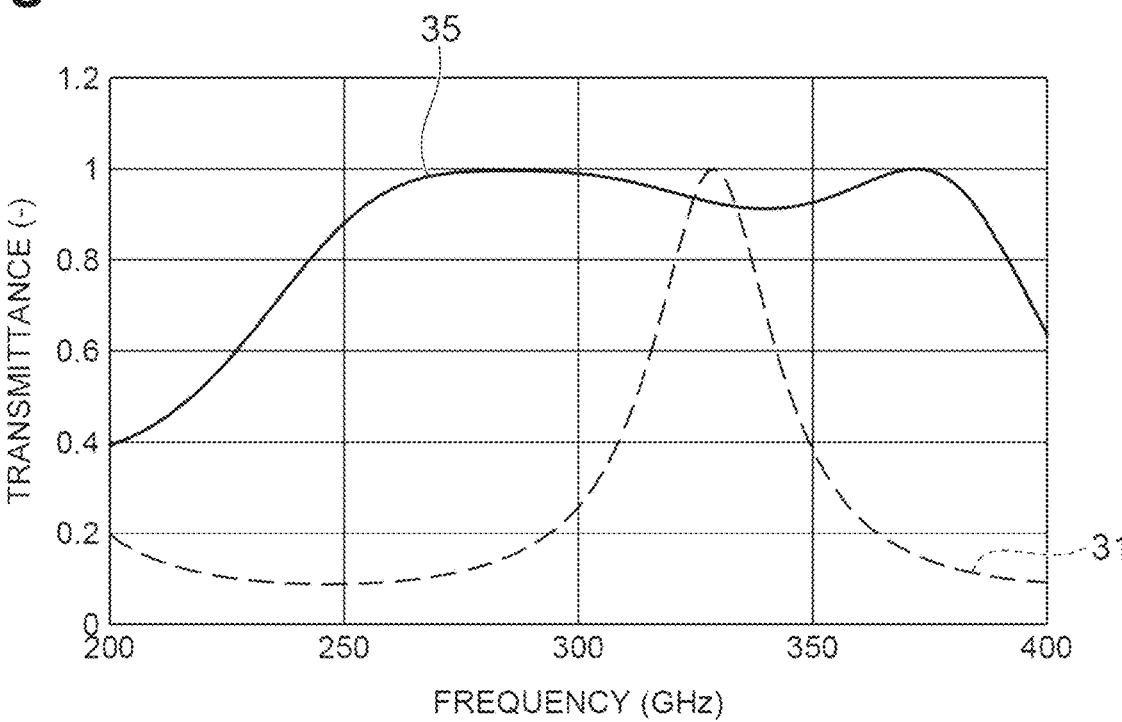
FIGS. 8A and 8B are diagrams showing simulation results of transmittances of the optical element according to a first modification.
Figure 8B:
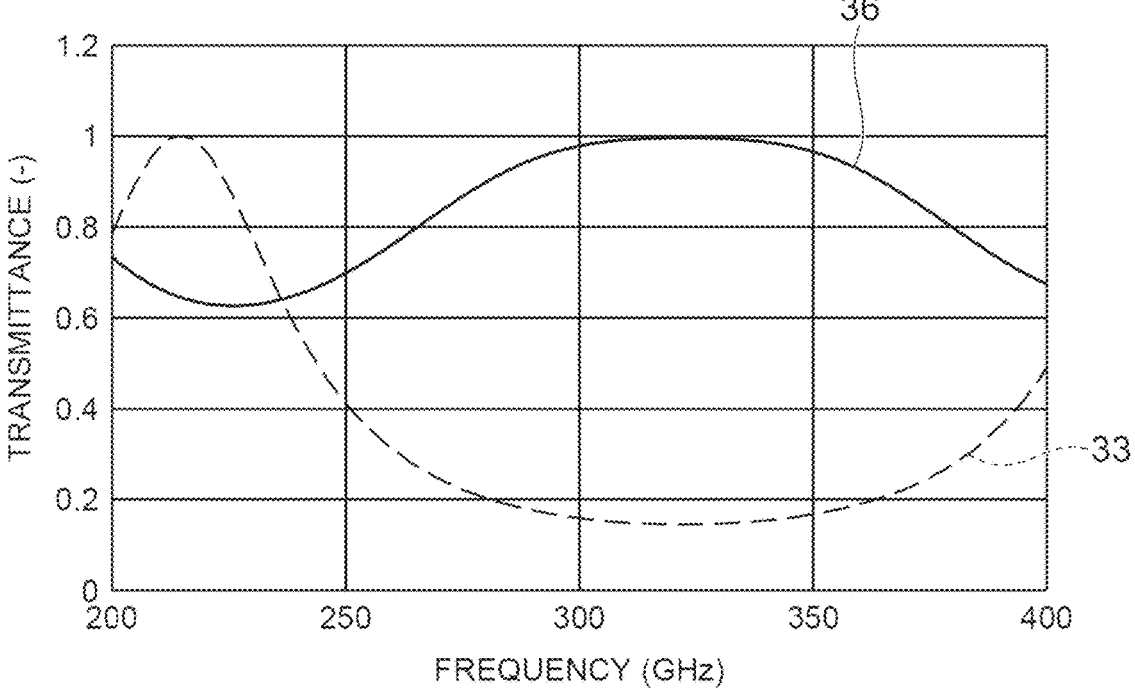

Also in the first modification described above, the same operation and effect as those of the above-described embodiment can be exhibited. Moreover, in the first modification, it is possible to provide the optical element 1 that exhibits high transmittance (for example, 99% or more) with respect to each polarization component of light in at least the above-described frequency band. FIGS. 8A and 8B are diagrams showing simulation results of transmittances of optical elements of the first modification. FIG. 8A shows simulation results of transmittances of polarization components along the ordinary axis, and FIG. 8B shows simulation results of transmittances of polarization components along the extraordinary axis. In each of FIGS. 8A and 8B, a vertical axis represents transmissivity (%), and a horizontal axis represents frequency (GHz). In FIG. 8A, plot 35 shows the transmission when the substrate of the optical element is a lithium niobate crystal and each antireflection film is a magnesium fluoride crystal. In FIG. 8B, plot 36 shows transmission when the substrate of the optical element is a lithium niobate crystal and each antireflection film is a calcium fluoride crystal. As shown in FIGS. 8A and 8B, also in the first modification, the transmissivity at 0.3 THz is greater than 0.9 in any of the polarization components. In addition, the frequency band in which the transmittance is greater than 0.9 is clearly broadened compared to the case where the optical element includes only the substrate. In addition, it can be seen that the first modification is more appropriate in a high frequency band than the above-described embodiment.

In the first modification, both the substrate 2 and the antireflection films 3 and 4 exhibit birefringence. Therefore, when the thickness of the substrate 2 is adjusted so that only the substrate 2 becomes a quarter wave plate with respect to a desired wavelength, a phenomenon in which the phase of light transmitted through the optical element 1 is shifted from the phase of light before transmission by ¼ or more may occur due to the influence of the antireflection films 3 and 4 indicating birefringence. Based on this phenomenon, the thickness of the substrate 2 and the thicknesses of the antireflection films 3 and 4 may be adjusted so that the optical element 1 becomes a (2X−1)/4 wave plate, a (2X−1)/2 wave plate, or a (2X−1)/8 wave plate (X is a natural number) as a whole. In this case, for example, the thicknesses of the antireflection films 3 and 4 are set in accordance with the wavelength of light incident on the optical element 1. Here, each of the substrate 2 and the antireflection films 3 and 4 according to the first modification has a birefringent index. Therefore, the thicknesses of the antireflection films 3 and 4 are set based on the relationship between the first absolute value of the difference between the third refractive index $n_{o2}$ of the antireflection film 3 and the square root of the first refractive index $n_{o1}$ of the substrate 2 and the second absolute value of the difference between the fourth refractive index $n_{e2}$ of the antireflection film 3 and the square root of the second refractive index $n_{e1}$. Therefore, the thicknesses of the antireflection films 3 and 4 are set based on the wavelength of the light incident on the optical element 1, the first absolute value, and the second absolute value. Thus, the respective thicknesses of the antireflection films 3 and 4 are not limited to an intermediate value between an ideal thickness in the third refractive index $n_{o2}$ and an ideal thickness in the fourth refractive index $n_{e2}$. The thickness of the substrate 2 is then set according to a phase difference $pd_1$ that has to be produced by the substrate 2. The phase difference $pd_1$ corresponds to the phase difference $pd_0$ that has to be caused by the optical element 1 minus the phase difference $pd_2$ caused by the antireflection films 3 and 4 ($pd_1=pd_0-pd_2$). The thickness of the substrate 2 is set based on the difference between the first refractive index $n_{o1}$ and the second refractive index $n_{e1}$ of the substrate 2. By carrying out the method described above, even when the antireflection films 3 and 4 exhibit birefringence, the optical element 1 as a whole can exhibit a desired phase difference.

For example, when a lithium niobate crystal is used as the substrate 2 and a magnesium fluoride crystal is used as the antireflection films 3 and 4 in order for the optical element 1 to function as a quarter wave plate suitable for 0.3 THz light, the thicknesses of the substrate 2 and the antireflection films 3 and 4 may be set to 138 µm and 111 µm, respectively.

Further, a case where linearly polarized light is desired to be converted into circularly polarized light using an optical element functioning as a quarter wave plate will be considered. The circularly polarized light corresponds to light in which amplitudes of polarized lights of two axes (for example, an x axis and a y axis) orthogonal to each other are equal to each other and a phase difference between the polarized lights is ¼ wavelength. Therefore, even when the phase difference between the polarized lights is ¼ wavelength, the polarized light is not circularly polarized light but elliptically polarized light if the amplitudes of the polarized lights are not equal to each other. For example, when the optical element according to the first modification is irradiated with light of 0.3 THz and the reflectivity of the polarization components along the ordinary axis is different from the reflectivity of the polarization components along the extraordinary axis, the light transmitted through the optical element becomes elliptically polarized light. When the linearly polarized light transmitted through the optical element is desired to be circularly polarized light, at least one of the thickness of the substrate 2 and the thicknesses of the antireflection films 3 and 4 may be further appropriately adjusted in consideration of the materials included in the substrate 2 and the antireflection films 3 and 4 and reflectance thereof.

As a specific example, it is assumed that an amplitude (first amplitude) of the polarization component along the ordinary axis and an amplitude (second amplitude) of the polarization component along the extraordinary axis in the light transmitted through the optical element are different from each other, and that the first amplitude is larger than the second amplitude. In this case, for example, the thicknesses of the antireflection films 3 and 4 are adjusted so that an amplitude (third amplitude) of the polarization component along the ordinary axis and an amplitude (fourth amplitude) of the polarization component along the extraordinary axis of the light transmitted through only the antireflection films 3 and 4 are different from each other. Here, the fourth amplitude is larger than the third amplitude, and a ratio between the fourth amplitude and the third amplitude is equal to a ratio between the first amplitude and the second amplitude. Accordingly, the amplitude of each polarization component is adjusted in the optical element, and the light transmitted through the optical element becomes circularly polarized light or approaches circularly polarized light. Although the above-described specific example is an example of amplitude mismatch due to reflection, amplitude mismatch based on a difference in absorption of each axis may be generated. Alternatively, the optical element may be designed using both influences of amplitude mismatch due to reflection and amplitude mismatch due to difference in absorption.

In the first modification described above, the substrate 2 and the antireflection films 3 and 4 are arranged such that the ordinary axis of the substrate 2 and the ordinary axes of the antireflection films 3 and 4 match with each other and the extraordinary axis of the substrate 2 and the extraordinary axes of the antireflection films 3 and 4 match with each other, but the arrangement is not limited thereto. For example, the ordinary axis of the substrate 2 may match with the extraordinary axes of the antireflection films 3 and 4, and the extraordinary axis of the substrate 2 may match with the ordinary axes of the antireflection films 3 and 4. Alternatively, at least one of the ordinary axis and the extraordinary axis of the substrate 2 may be different from the ordinary axes and the extraordinary axes of the antireflection films 3 and 4. In this case, the ordinary axis of the substrate 2 may match with one of the ordinary axes and the extraordinary axes of the antireflection films 3 and 4, and the extraordinary axis of the substrate 2 may not match with the ordinary axes and the extraordinary axes of the antireflection films 3 and 4. Alternatively, the ordinary axis of the substrate 2 may not match with the ordinary axes and the extraordinary axes of the antireflection films 3 and 4, and the extraordinary axis of the substrate 2 may match with any one of the ordinary axes and the extraordinary axes of the antireflection films 3 and 4. Also in these cases, the optical element can be designed so as to exhibit a desired function as a whole. In addition, the thicknesses, optical axis orientations, and the like of bire-fringence materials stacked on each other are adjusted so that a desired phase difference is obtained in the entire wavelength range to be used. For example, the thicknesses, the optical axis orientations, and the like is adjusted by performing optimization calculation using the thickness, material, angle, and number of members included in the optical element as variables. Thus, the usable frequency band can be widened.

Second Modification

Figure 9A:
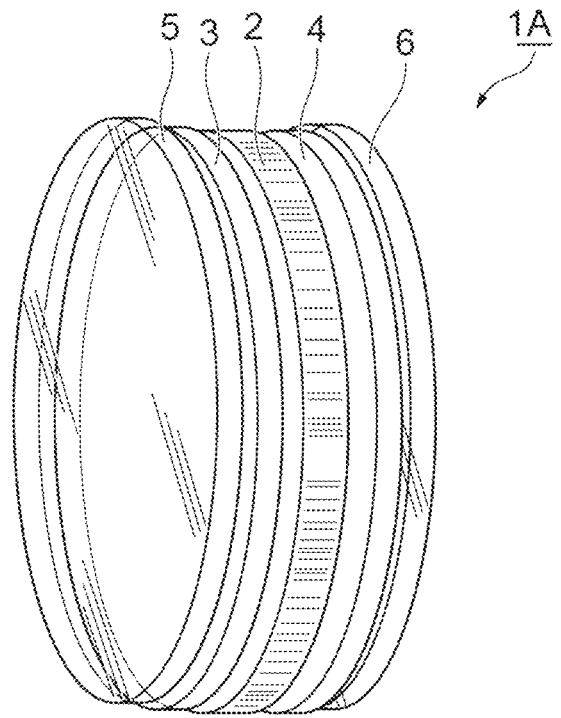
FIG. 9A is a schematic perspective view of an optical element according to a second modification.
Figure 9B:
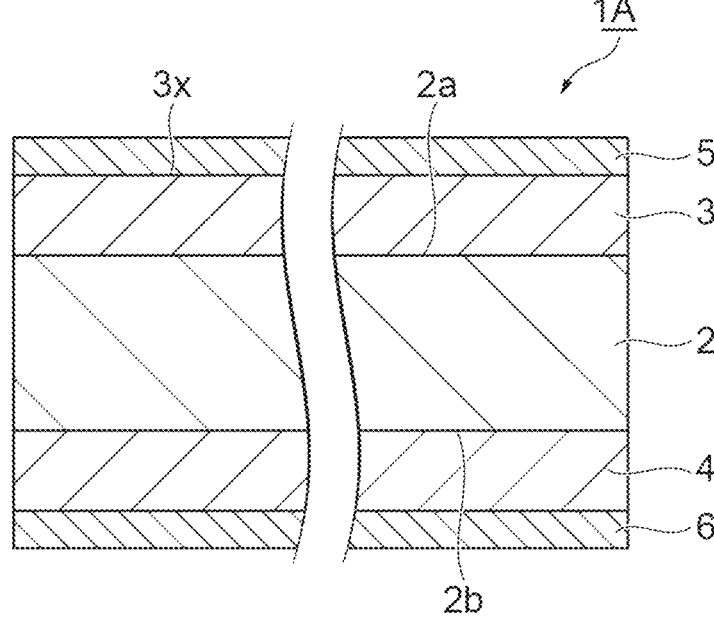
FIG. 9B is

The optical element according to the second modification is different from the above-described embodiment in that at least a pair of light transmitting films is provided. FIG. 9A is a schematic perspective view of an optical element according to a second modification, and FIG. 9B is a schematic cross-sectional view of a main part of the optical element according to the second modification. The optical element 1A shown in FIGS. 9A and 9B includes a substrate 2, antireflection films 3 and 4, a light transmission film 5 located on the antireflection film 3, and a light transmission film 6 located on the antireflection film 4. Each of the light transmission films 5 and 6 is an optical component for reducing the reflectance of the optical element 1, and has a single-layer structure. In the second modification, the light transmission films 5 and 6 have structures and compositions similar to each other. Therefore, only the light transmission film 5 will be described in detail below.

A thickness of the light transmission film 5 is appropri-ately adjusted in accordance with applications of the optical element 1A, materials included in the substrate 2, materials included in the antireflection film 3, materials included in the light transmission film 5, frequency of light incident on the optical element 1A, and the like. In the present embodiment, the thickness of the light transmission film 5 changes according to the thickness of the antireflection film 3, and the total thickness of the antireflection film 3 and the light transmission film 5 is 2 μm or more and 550 μm or less. In the second modification, the total thickness of the antire-flection film 4 and the light transmission film 6 is also 2 μm or more and 550 μm or less. The light transmission film 5 may be directly fixed to a main face 3x, or may be indirectly fixed to the main face 3x. In the former case, the light transmission film 5 is a coating part for the main face 3x, for example. In the latter case, the light transmission film 5 is fixed on the main face 3x via an adhesive or the like, for example.

In the low frequency band, the refractive index of the light transmission film 5 is, for example, equal to or more than the refractive index of air (1 or more) and equal to or less than the refractive index of the antireflection film 3. From the viewpoint of light transmittance from the antireflection film 3 to the light transmission film 5, the refractive index of the light transmission film 5 in the low frequency band is close to the square root of the refractive index of the antireflection film 3. For example, an absolute value of a difference between a refractive index of the light transmission film 5 and the square root of the refractive index of the antireflec-tion film 3 in the low frequency band is 0.5 or less. In this case, in the low frequency band, the reflectance of the light incident on the light transmission film 5 from the antireflec-tion film 3 can be suppressed to 5% or less. The absolute value may be 0.3 or less or may be 0.1 or less. When the absolute value is 0.1 or less, in low frequency band, the reflectance of the light incident on the light transmission film 5 from the antireflection film 3 can be suppressed to less than 1%.

The light transmission film 5 includes, for example, an oxide, a boride, a nitride, a chloride, a bromide, or a fluoride. They may be crystalline. In this case, the light transmission film 5 may be formed of a crystal or may include a crystal as a main component. The light transmission film 5 may include, for example, a BBO crystal, a quartz crystal, or the like. For example, when sapphire, which is aluminum oxide, is used as the material of the antireflection film 3 and titanium oxide is used as the material of the substrate 2, the light transmission film 5 may include calcium fluoride crystal or the like.

Also in the optical element 1A according to the second modification described above, the same operation and effect as those of the above-described embodiment are exhibited. Moreover, in the second modification, it is possible to widen the frequency band in which the transmittance exceeds 0.9 as compared with the first modification.

In the second modification, the light transmission film 5 may indicate birefringence. For example, the light transmis-sion film 5 may be formed of a material exhibiting birefrin-gence, such as quartz. A refractive index of the light trans-mission film 5 along an ordinary axis of the light transmission film 5 is referred to as a fifth refractive index $n_{o3}$, and a refractive index with respect to the polarization direction along an extraordinary axis is referred to as a sixth refractive index $n_{e3}$. The fifth refractive index $n_{o3}$ is greater than the sixth refractive index $n_{e3}$. In the light transmission film 5 indicating birefringence, the ordinary axis corre-sponds to the slow axis, and the extraordinary axis corre-sponds to the fast axis. In this case, the substrate 2, the antireflection films 3 and 4, and the light transmission films 5 and 6 may be arranged such that the ordinary axis of the substrate 2, the ordinary axes of the antireflection films 3 and 4, and the ordinary axes of the light transmission films 5 and 6 match with each other, and the extraordinary axis of the substrate 2, the extraordinary axes of the antireflection films 3 and 4, and the extraordinary axes of the light transmission films 5 and 6 match with each other. The ordinary axes of the light transmission films 5 and 6 may be different from at least one of the ordinary axis of the substrate 2 and the ordinary axes of the antireflection films 3 and 4, or the extraordinary axes of the light transmission films 5 and 6 may be different from at least one of the extraordinary axis of the substrate 2 and the extraordinary axes of the antireflection films 3 and 4. The ordinary axes of the light transmission films 5 and 6 may match with at least one of the extraordinary axis of the substrate 2 and the extraordinary axes of the antireflection films 3 and 4, or the extraordinary axes of the light transmission films 5 and 6 may match with at least one of the ordinary axis of the substrate 2 and the ordinary axes of the antireflection films 3 and 4. Alternatively, the ordinary axis and the extraordinary axis of the substrate 2, the ordinary axes and the extraordinary axes of the antireflection films 3 and 4, and the ordinary axes and the extraordinary axes of the light transmission films 5 and 6 may be different from each other.

Each of the absolute values of the difference between the fifth refractive index $n_{o3}$ of the light transmission film 5 and the square root of the third refractive index $n_{o2}$ of the antireflection film 3 in the low frequency band and the difference between the sixth refractive index $n_{e3}$ of the light transmission film 5 and the square root of the fourth refractive index $n_{e2}$ in the low frequency band is, for example, 0.3 or less. In this case, in the low frequency band, the reflectance of each polarization component incident on the light transmission film 5 from the antireflection film 3 can be suppressed to 5% or less. The absolute value may be 0.2 or less or may be 0.1 or less. When the absolute value is 0.1 or less, in the low frequency band, the reflectance of each polarization component incident on the light transmission film 5 from the antireflection film 3 can be suppressed to be less than 1%.

Hereinabove, one aspect of the present disclosure has been described in detail based on the above-described embodiment and each of the above-described modifications. However, one aspect of the present disclosure is not limited to the above-described embodiment and the above-described modifications. One aspect of the present disclosure can be further modified without departing from the scope thereof. In addition, the above-described embodiment and each modification may be appropriately combined. For example, the first and second modifications may be combined. In this case, for example, the ordinary axis of the light transmission film may match with the ordinary axis of the antireflection film, the ordinary axis of the light transmission film may match with the extraordinary axis of the antireflection film, or the ordinary axis of the light transmission film and the extraordinary axis of the antireflection film may not match with each other. In addition, the extraordinary axis of the light transmission film may match with the ordinary axis of the antireflection film, the extraordinary axis of the light transmission film may match with the extraordinary axis of the antireflection film, or the extraordinary axis of the light transmission film and the extraordinary axis of the antireflection film may not match with each other. The thicknesses of the substrate, antireflection film, and light transmission film may be adjusted as appropriate.

In the embodiment and the modifications described above, the optical element includes two antireflection films, but is not limited thereto. The optical element may comprise an antireflection film. In this case, for example, the exposed face of the substrate of the optical element may directly contact another optical element (for example, a sensor, a terahertz wave light source, or the like). In addition, the antireflection film has a single layer structure, but is not limited thereto. The antireflection film may have a multi-layer structure.

In the above-described embodiment, the substrate and the antireflection films are arranged such that the ordinary axis of the optical element and the ordinary axes of the antireflection films match with each other, and the extraordinary axis of the substrate and the extraordinary axes of the antireflection films match with each other, but no limited thereto. For example, the ordinary axis of the substrate may match with the extraordinary axes of the antireflection films, and the extraordinary axis of the substrate may match with the ordinary axes of the antireflection films. Alternatively, at least one of the ordinary axis and the extraordinary axis of the substrate may be different from the ordinary axes and the extraordinary axes of the antireflection films.

In the second modification described above, the optical element includes two light-transmissive films, but no limited thereto. The optical element may comprise one light transmissive film. The light-transmitting film has a single-layer structure, but no limited thereto. The light-transmitting film may have a multilayer structure.

What is claimed is:

1. An optical element for a low frequency band, the optical element comprising:
   a substrate including a first main face and a second main face, the substrate having birefringence; and
   an antireflection film located on the first main face,
   wherein the low frequency band is lower than a reststrahlen band of the antireflection film,
   wherein an absolute value of a difference between a first refractive index and a second refractive index of the substrate in the low frequency band is 0.2 or more,
   wherein a thickness of the substrate is 15 μm or more and 4000 μm or less,
   wherein the first refractive index is a refractive index with respect to a first polarization direction along an ordinary axis,
   wherein the second refractive index is a refractive index with respect to a first polarization direction along an extraordinary axis, and
   wherein a material for the antireflection film has a reststrahlen band.

2. The optical element according to claim 1, wherein the difference between the first refractive index and the second refractive index in the low frequency band is 0.8 or more.

3. The optical element according to claim 2, wherein the difference between the first refractive index and the second refractive index in the low frequency band is 1.4 or more and 5.0 or less.

4. The optical element according to claim 1, wherein the substrate has a trigonal crystal structure containing lithium.

5. The optical element according to claim 4, wherein the substrate includes at least one of lithium niobate and lithium tantalate.

6. The optical element according to claim 1, wherein, in the low frequency band, each of an absolute value of a difference between a refractive index of the antireflection film and a square root of the first refractive index and an absolute value of a difference between the refractive index and a square root of the second refractive index is 0.5 or less.

7. The optical element according to claim 6, wherein an absolute value of a difference between the refractive index of the antireflection film in the low frequency band and a refractive index of the antireflection film in a visible range is 0.5 or more.

8. The optical element according to claim 1, wherein the antireflection film has birefringence in the low frequency band, wherein a first absolute value of a difference between a third refractive index of the antireflection film in the low frequency band and a square root of the first refractive index is 0.5 or less, wherein a second absolute value of a difference between a fourth refractive index of the antireflection film in the low frequency band and a square root of the second refractive index is 0.5 or less, wherein the third refractive index is a refractive index with respect to the first polarization direction along the ordinary axis, and wherein the fourth refractive index is a refractive index with respect to the second polarization direction along the extraordinary axis.

9. The optical element according to claim 8, wherein a thickness of the antireflection film is determined based on a wavelength of light incident on the optical element, the first absolute value, and the second absolute value, and wherein the thickness of the substrate is determined based on the thickness of the antireflection film, a value obtained by subtracting a phase difference caused by the antireflection film from a phase difference that should be caused by the optical element, and a difference between the first refractive index and the second refractive index.

10. The optical element according to claim 8, wherein a fast axis of the substrate matches with a fast axis of the antireflection film, and wherein a slow axis of the substrate matches with a slow axis of the antireflection film.

11. The optical element according to claim 8, wherein at least one of a fast axis and a slow axis of the substrate does not match with a fast axis and a slow axis of the antireflection film.

12. The optical element according to claim 1, wherein the antireflection film includes a fluoride.

13. The optical element according to claim 12, wherein the fluoride includes at least one of lithium fluoride, magnesium fluoride, calcium fluoride, and barium fluoride.

14. The optical element according to claim 1, wherein the substrate includes titanium oxide, and wherein the antireflection film includes aluminum oxide.

15. The optical element according to claim 1, further comprising a second antireflection film located on the second main face.

16. The optical element according to claim 1, further comprising a light transmitting film located on the antireflection film and having a refractive index lower than that of the antireflection film.

17. An optical element comprising:

a substrate having a first main face and a second main face, the substrate having birefringence; and an antireflection film located on the first main face, wherein an absolute value of a difference between a first refractive index and a second refractive index of the substrate in a low frequency band lower than a reststrahlen band of the antireflection film is 0.2 or more, wherein a thickness of the substrate is 15 μm or more and 4000 μm or less, wherein, in the low frequency band, a reflectance of the light incident on the optical element is 10% or less, wherein the first refractive index is a refractive index with respect to a first polarization direction along an ordinary axis, wherein the second refractive index is a refractive index with respect to a second polarization direction along an extraordinary axis, and wherein a material for the antireflection film has a reststrahlen band.

18. The optical element according to claim 17, wherein the difference between the first refractive index and the second refractive index in the low frequency band is 1.4 or more and 5.0 or less.

19. The optical element according to claim 17, wherein the antireflection film has birefringence in the low frequency band, wherein a first absolute value of a difference between a third refractive index of the antireflection film in the low frequency band and a square root of the first refractive index is 0.5 or less, and wherein a second absolute value of a difference between a fourth refractive index of the antireflection film in the low frequency band and a square root of the second refractive index is 0.5 or less.

20. The optical element according to claim 17, further comprising a second antireflection film located on the second main face.

* * * * *